C. A. VAN DUSEN.
SPOOL OR HOLDER FOR COMMUTATORS.
APPLICATION FILED SEPT. 20, 1920.
1,424,954.
Patented Aug. 8, 1922.
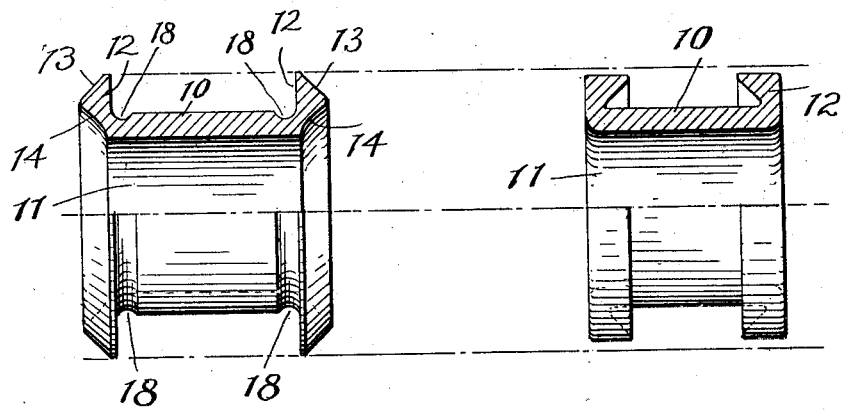
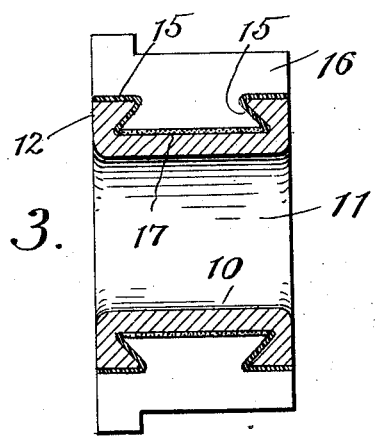
Inventor
Charles A. Van Dusen
by
Thurston Kwis & Hudson
attys.

UNITED STATES PATENT OFFICE.

CHARLES A. VAN DUSEN, OF TOLEDO, OHIO, ASSIGNOR TO THE TOLEDO STANDARD COMMUTATOR COMPANY, OF TOLEDO, OHIO, A CORPORATION OF OHIO.

SPOOL OR HOLDER FOR COMMUTATORS.

1,424,954.     Specification of Letters Patent.     Patented Aug. 8, 1922.

Application filed September 20, 1920. Serial No. 411,565.

*To all whom it may concern:*

Be it known that I, CHARLES A. VAN DUSEN, a citizen of the United States, residing at Toledo, in the county of Lucas and State of Ohio, have invented a certain new and useful Improvement in Spools or Holders for Commutators, of which the following is a full, clear, and exact description.

This invention relates to a spool or holder for commutators, and is an improvement on the spools or holders shown and claimed in my prior Patent No. 1,354,007, granted on the 28th day of September, 1920.

In my prior patent above referred to, I have shown several types of a one-piece spool or holder for commutators having at its ends integral flanges which are swaged inwardly to segment clamping or holding position, preferably by a series of closing operations, as explained in my prior Patent No. 1,329,277, granted January 27, 1920. As explained in this last mentioned patent, the barrel or cylindrical part of the spool or holder is surrounded with an insulating material preferably in plastic form when applied, and this is hardened preferably by a baking process prior to the last closing operation, so that when the assembly is subjected to the last closing operation, not only are the end flanges swaged inwardly into tight clamping engagement with the insulation overlying the tangs of the segments, but the inner edges of the segments are clamped down tight against this insulating medium, producing an exceedingly effective and tight commutator.

The object of the present invention is to provide a one-piece spool or holder possessing all the advantages of the holders disclosed in my patents above referred to, as well as performing all the functions thereof, and having certain improvements which in the final closing operation provide a practically square end at the end of the holder and also give a longer shaft bearing.

In the accompanying sheet of drawings wherein I have shown one embodiment only of my invention, Fig. 1 is a view partly in section and partly in side elevation of a one-piece spool or holder embodying my invention; Fig. 2 is a similar view of the spool or holder as it appears after the final closing operation; and Fig. 3 is a sectional view of the completed commutator, employing my improved spool or holder.

Referring to the drawings, and first to Fig. 1, the spool or holder has a barrel or cylindrical portion 10 and a shaft opening 11, and it is provided at its ends with integral segment clamping flanges 12. The inner faces of these flanges are preferably parallel and normal to the axis of the holder, and their outer faces 13 are on a taper. The ends of the holder are recessed as shown at 14, the recesses here shown being somewhat conical.

It may be stated at this point that these segment clamping flanges are adapted to be swaged inwardly onto the insulation 15, (preferably mica) covering the tangs of the segments 16 of the commutator, and the tapered faces or surfaces 13 are adapted to be forcibly pressed outward against the similar insulation within the overhanging portions of the segments as shown in Fig. 3, and this is preferably done as described in my prior Patent No. 1,329,277 in several closing operations. In the final closing operation the inner edges of the segments are tightly pressed or clamped down against a hard insulating medium 17 surrounding the barrel 10, this insulating medium being formed as described in Patent No. 1,329,277 and in Patent No. 1,354,006, granted September 28th, 1920, in the name of S. N. Sloan, and consisting of bakelite, asbestos soaked with shellac, or other insulating material which can be applied in a plastic or semi-plastic form and which becomes exceedingly hard and unyielding by the baking process.

With all the different spools shown in my prior Patent No. 1,354,007 of September 28th, 1920, having flanges whose outer faces are on a taper and adapted to be pressed outwardly against the overhanging portions of the segments while the inner faces of the flanges are swaged inwardly to segment clamping position over the insulated surfaces of the tangs, the greatest bending of the flanges takes place a slight distance from the barrel or from the inner portions of the segments, the flanges being so shaped that the bending would take place at the point stated in order that the metal might be forced or swaged to the desired position with reference to the tangs and overhanging portions of the segments. This leaves the bore or shaft opening rounded at its ends, and of necessity reduces somewhat the length of the shaft bearing.

These disadvantages are overcome by my invention chiefly by the provision of grooves 18 in the outer surface of the barrel just inside the inner faces of the flanges. These grooves perform the double function of thinning the metal at the base or inner portions of the flanges so that they can be readily bent or swaged inwardly about their inner portions, and they also provide spaces for the flow of metal during the swaging operations, particularly the final closing operation where the greatest pressure is provided. It will be observed by a comparison of Figs. 1 and 2, that after the final closing operation the grooves are eliminated by the inward flow of metal during the swaging operations.

This leaves practically square ends at the ends of the shaft opening instead of the somewhat rounded ends, there being only a slight outward taper or rounding at the extreme ends of the shaft opening. Likewise it leaves a much longer shaft bearing than with my prior spools of this same general type.

A further advantage lies in the fact that the metal need not be bent to the same degree or extent as with my prior holders, so that there is less liability of breaking or tearing the metal in the swaging operations than heretofore.

It might be mentioned in conclusion that in forming my improved spool or holder the angle between the inner flat faces of the flanges and the tapered faces is made somewhat greater than 45°, preferably about 49°, but when the flanges are swaged inwardly to their final positions so that the inner previously parallel faces occupy a 45° position, the outer previously tapered faces or surfaces 13 now become cylindrical surfaces coaxial with the barrel, and during the last swaging operation the angle between these faces is reduced in the drawing operation to a 45° angle. It will be noticed also, by reference to Figs. 1 and 2, that the diameter of the spool is reduced in the closing operations, and that its length is also reduced.

While I have shown only one form of my invention, I do not wish to be confined to the precise details shown, as the holder, particularly at its ends, may assume other shapes than herein illustrated.

Having described my invention, I claim:

1. A one-piece spool or holder for commutators comprising a body portion with integral segment clamping flanges at its ends, and provided with external grooves or recesses at the inner portions of the flanges.

2. A one-piece spool or holder for commutators comprising a cylindrical barrel having at its ends integral segment holding flanges, and provided with grooves at the inner faces of the flanges.

3. A one-piece spool or holder for commutators comprising a cylindrical body provided at its ends with integral segment clamping flanges with relatively tapered faces adapted to engage insulation covering the tangs and overhanging portions of the segments when the flanges are swaged inwardly, and provided with means for causing the flanges to be bent substantially entirely about the extreme inner portions thereof during the swaging operation or operations.

4. A one-piece spool or holder for commutators comprising a cylindrical barrel having at its ends integral segment clamping flanges adapted to be swaged inwardly to segment holding position, and provided with faces adapted to engage insulation covering the tangs and overhanging portions of the segments, the thinnest portions of the flanges being at the junction of the segments with the ends of the barrel, or at the extreme inner portions of the flanges.

In testimony whereof, I hereunto affix my signature,

CHARLES A. VAN DUSEN.